Dec. 9, 1969  E. C. BLACKWOOD  3,482,821
UTILITY FARM VEHICLE FOR MIXING
AND DISCHARGING BULK MATERIAL
Filed March 25, 1968

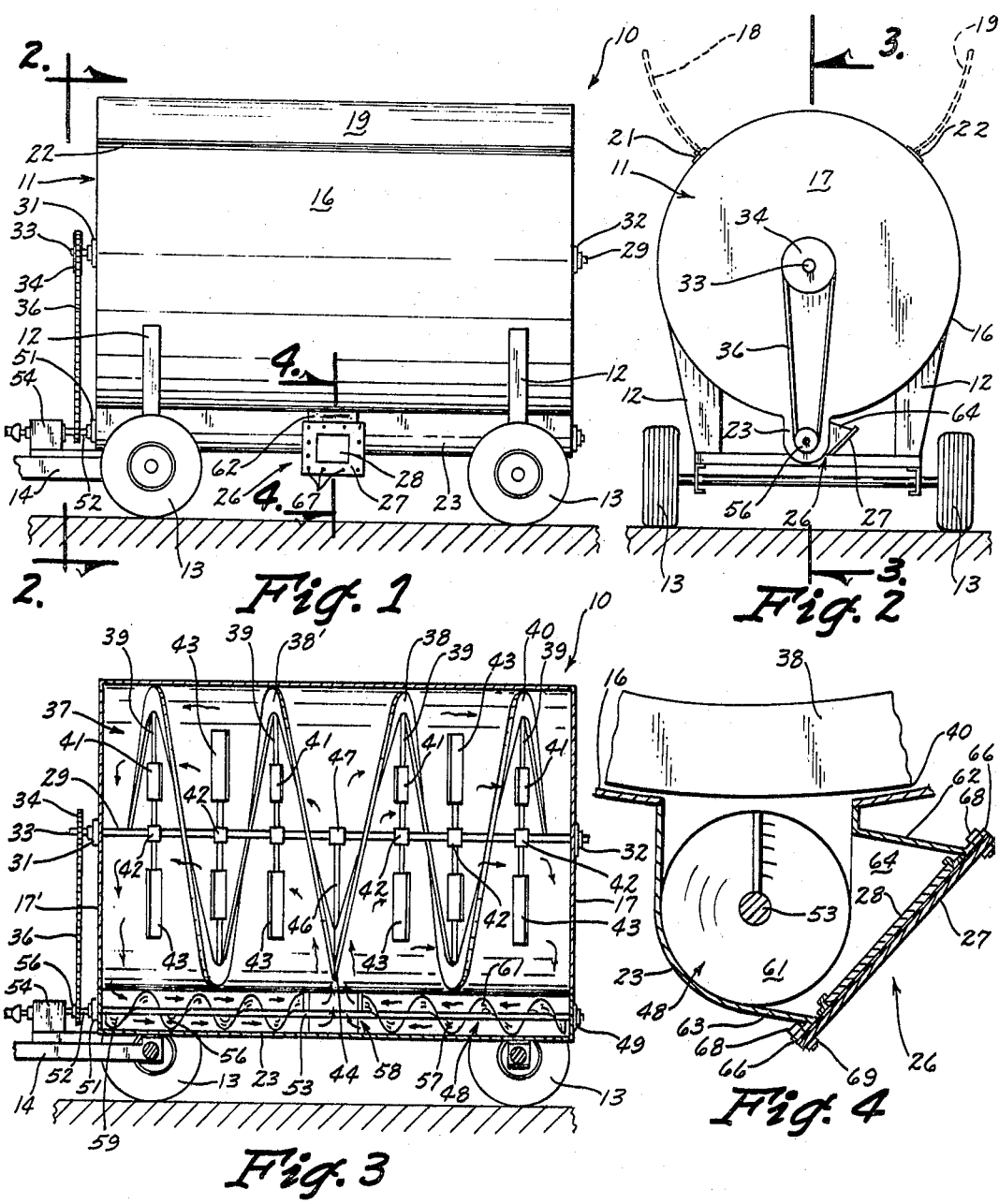

INVENTOR
EVERETT C. BLACKWOOD
BY
ATTORNEY

United States Patent Office 3,482,821
Patented Dec. 9, 1969

3,482,821
UTILITY FARM VEHICLE FOR MIXING AND
DISCHARGING BULK MATERIAL
Everett C. Blackwood, Newton, Iowa 50208
Filed Mar. 25, 1968, Ser. No. 715,927
Int. Cl. B01f 7/04, 7/08, 15/02
U.S. Cl. 259—6                                          6 Claims

ABSTRACT OF THE DISCLOSURE

This invention relates to a utility farm vehicle for mixing and discharging bulk materials; the vehicle comprising a tank for receiving the material mounted on a wheeled frame, the tank having a hinged top cover and a shaft rotatably mounted within the tank along the longitudinal axis thereof, agitators attached to the shaft and extending radially of the axis toward the circular wall of the tank, a cross feed auger recessed in a longitudinally disposed trough forming the tank bottom, the auger moving the material inwardly from the end walls of the tank, the moved material either accumulating for redistribution throughout the tank by the rotating agitators or discharged through an outlet passage in the trough.

BACKGROUND OF THE INVENTION

This invention relates to a novel utility vehicle for use in mixing and discharging bulk material of a liquid or a solid nature.

Modern farming methods necessitate the transporting of bulk materials, both liquid and solid, from one place to another. Frequently, the materials are of such a nature that constant mixing is required to produce or maintain a homogeneous mixture or to prevent the material from packing in transportation and fouling the discharge chute. Also, some materials are of such a nature that they require transportation in an enclosed vehicle such as liquids or powdery solids, whereas others do not require this protection. Some materials require spreading at the place of use whereas others need only be dumped. Because of the extreme variances in consistency and application of the various bulk materials used in modern farming, a various assortment of wagons are marketed for each particular use and each is not readily adaptable, if at all, for practical employment in handling a variety of materials.

In order to be adaptable for multi-material use, the vehicle of this invention employs an auger extending across the bottom of the material covering trough and a rotating agitator disposed within the tank to provide constant movement of the materials.

The applicant is aware of a tank mounted on a vehicle and having an agitator rotatable therein and a longitudinally disposed cylinder having a rotating auger disposed therein, the tank and cylinder separated by a slip valve traversing a passageway between the tank and the cylinder. The disadvantage accompanying this type of arrangement is that dry, powdery material tends to pack and block the passageway during transportation and a complete mechanical discharge of the material is impossible.

Another vehicle having a body mounted thereon for blending and transporting bulk materials is known, the body having a longitudinally disposed agitator and an auger disposed longitudinally on the floor within the body. The disadvantage of this type of arrangement is that it is not suitable for liquid materials and the structural arrangement of the body prevents total material agitation when the body is full of material.

SUMMARY OF THE INVENTION

This invention relates to a utility farm vehicle for mixing and discharging bulk material; the vehicle having a tank mounted on a wheeled frame, the tank having a hinged top inlet cover, sides, a pair of longitudinally spaced end walls and a recessed trough bottom having an outlet, a shaft member traversing the tank and rotatably mounted to the end walls, and mixing means connected to the shaft and extending radially throughout the tank, and a cross feed auger disposed within the trough to move the material within the trough inwardly from both ends thereof for discharge through the outlet or into contact with the agitator means for redistribution throughout the tank.

It is an object of this invention to provide an improved utility farm vehicle for mixing and discharging bulk material.

It is another object of this invention to provide a utility farm vehicle capable of handling both liquid and solid bulk material.

It is still another object of this invention to provide a basic utility farm vehicle which is adaptable to numerous uses.

It is yet another object of this invention to provide a utility farm vehicle which readily adapts for spreading both liquid and solid bulk material.

An object of this invention is to provide a utility farm vehicle which is simple, economical, and rugged in construction.

These objects, and other features and advantages will become readily apparent upon reference to the following description when taken in conjunction with the accompanying drawings.

BRIEF DESCRIPTION OF THE DRAWINGS

FIG. 1 is a side elevational view of the apparatus of this invention shown in assembled relation with a wheeled frame;

FIG. 2 is an end view as taken along the line 2—2 of FIG. 1;

FIG. 3 is a cross-sectional view as taken along the line 3—3 of FIG. 2 with arrows showing the direction of circulation of the moving material during operation of the apparatus;

FIG. 4 is an enlarged cross-sectional view showing the auger trough and outlet, as taken along the line 4—4 of FIG. 1;

Figure 5:
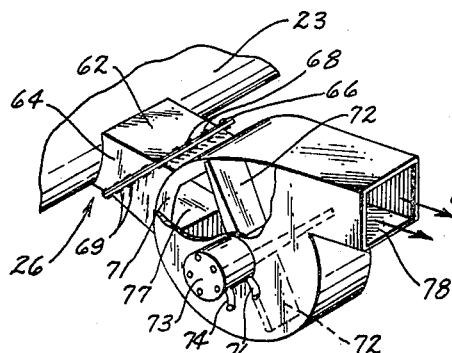
FIG. 5 is a perspective view of a modified liquid manure spreader attachment connected to the apparatus, certain parts being broken away for clarity of illustration.

DESCRIPTION OF THE PREFERRED
EMBODIMENT

Referring now to the drawings, and particularly to FIGS. 1 and 2, the bulk material mixing and discharging vehicle of this invention is indicated generally at 10 having a bulk material tank 11 of a cylindrical type supported on a portable frame 12 mounted on wheels 13. The front end of the frame 12 is secured to a tongue 14 which is adapted to be attached to a power driven vehicle such as a tractor (not shown).

The tank 11 is cylindrical, having curved sides 16, and is sealed at its logitudinal ends by a pair of identical end-walls 17, 17'. The tank 11 is provided with a pair of elongated panels 18, 19 shaped to synchronize with the curvature of the cylindrical tank 11. The panels 18, 19 are pivotally connected to the sides 16 of the tank 11 by a pair of hinges 21, 22 and extend the length of the tank 11, and pivot inwardly to provide a top cover (FIG. 1) for the tank 11 for protecting the material from the elements of the weather and to withhold liquid or powdery materials in the tank 11 during transportation. The panels 18, 19 pivot outwardly (FIG. 2) to provide a substantially large inlet for the material extending the length of the tank 11. The top covers 18, 19 are hinged to permit the covers 18, 19 to serve as flared sides (FIG. 2) to guide the material inwardly when loading the tank 11.

A recessed chamber or trough 23 is longitudinally disposed below the tank 11 from end wall 17 to end wall 17' to form the tank bottom. The trough 23 has a curved floor in cross-section and an outlet chute 26 laterally attached thereto. The outlet 26 is sealed by a removable door member 27 having a sliding panel 28 slidably mounted thereto.

A shaft 29 (FIG. 3) extends through the end walls 17, 17' of the tank 11 along the logitudinal axis of the tank 11 and is rotatably mounted in sealed bearings 31, 32 attached to the outer surface of the respective end walls 17, 17'. The forwardly extended portion 33 of the shaft 29 serves to attach a drive wheel 34 (FIG. 2) connected by a chain member 36 to a power source as hereinafter described to rotate the shaft 29.

A mixing apparatus designated generally as 37 (FIG. 3) is attached to the shaft 29 to mix the material in the tank 11 and to keep the material from packing. The apparatus 37 illustrated comprises a spiral agitator 38, 38' attached to a plurality of radially extended rods 39 having mixing blades 41 attached thereto and connected to the shaft 29 by a plurality of collars 42. At an end of each rod 39 opposite the mixing blade 41, a second mixing blade 43 is mounted which blade 43 provides movement of the material between the flightings of the spiral agitators 38, 38'. The outer edge 40 of each of the spiral agitators 38, 38' is designed such that the circumference is less than the circumference of the inner periphery of the tank 11 as best illustrated in FIGS. 3 and 4, to permit movement of all the material in the tank 11 at least once every revolution of the agitators 38, 38'.

The agitator 38, 38' is comprised of two portions, one portion 38 designed to move the material rearwardly toward the end wall 17, and the second portion 38' designed to move the material forwardly toward the end wall 17' upon rotation of the apparatus 37 and shaft 29. The two portions 38, 38' merge at a point 44 immediately above the outlet 26 (FIG. 1) attached to the trough 23. The merging point 44 of the agitators 38, 38' is connected to the rotatable shaft 29 by a bladeless rod 46 and collar 47.

Disposed longitudinally within the trough 23 (FIG. 1) is a cross feed auger 48 (FIG. 3) extending through the end walls 17, 17' and rotatably mounted in a pair of sealed bearings 49, 51 attached to the outside surface thereof. The forwardly extended portion 52 of the auger shaft 53 connects a gear and a gear box 54 attached to a power source such as a tractor power takeoff. Intermediate the gear box 54 and the bearing 51 is a drive wheel 56 (FIG. 2) connecting the drive wheel 34 by a chain member 36 for rotating the shaft 29.

The radius of the cross feed auger 48 extends substantially to the inner peripheral surface of the trough 23, and in cross section (FIG. 4) encompasess substantially all the area within the trough 23. The auger 48 includes substantially three portions 56, 57 and 58; the first portion 56 having clockwise arranged flighting 59 attached to the auger shaft 53 to move the bulk material within the trough 23 inwardly from the end wall 17' upon rotation of the auger 48, the second portion 57 having a counter-clockwise arranged flighting 61 attached to the auger shaft 53 to move the material in the trough 23 inwardly from the end wall 17 upon rotation of the auger 48, and the third portion 58 being an area of the auger 48 having only the flightless shaft 58 spaced between the two flighting portions 56, 57, and lateral to the outlet 26 (FIG. 4) for receiving the inwardly fed material.

When the outlet door 27 is open the constant flow of material will thus push the preceding material through the discharge outlet 26 and when the door is closed, the constant flow of material from both directions will push the material upward (see arrows, FIG. 3) to engage the revolving agitator 38, 38' at the merged portion 44 to recirculate through the tank 11.

The discharge outlet 26 comprises an enclosed passageway or chute fluidly communicating with the interior of the trough 23 and laterally attached thereto. The chute comprises a top member 62 being a bent extension of the trough 23 side, and a bottom 63 being an extension of the opposite trough 23 side, and a pair of side members 64 (FIG. 2) attached, as by welding, to the trough 23 and the lateral ends of the top 62 and bottom 63 members. The top 62, bottom 63, and side members 64 of the outlet 26 form an opening defined by a flange 66 (FIG 4) to provide a flush surface to attach the outlet door 27 and spreader attachments as hereinafter described. The outlet flange 66 includes a pluarlity of bores 67 (FIG. 1) for receiving bolts 68 for attachments.

To adapt the vehicle 10 of this invention to numerous uses, the proper discharge spreader attachement is attached to the laterally connected outlet 26 by bolts 68 and nuts 69 inserted through the bores 67 formed in the outlet flanges 66. Some of the basic attachments required to handle practically all bulk material encountered are illustrated in FIGS. 5-8.

A liquid manure spreader is illustrated in FIG 5 modified to receive the material from the back 71 of the receiving chamber. The spreader blades 72 are powered by a hydraulic motor 73 fluidly connected by hose members 74, 76 to a pump located on the tractor. The blades 72 generate great speed and hurl the material entering the blade chamber through the passageway 77 of the inlet 26 formed in the back 71 of the chamber outwardly through the spreader outlet 78 (see arrows) to the area being fertilized as the vehicle 10 moves forward.

Figure 6:
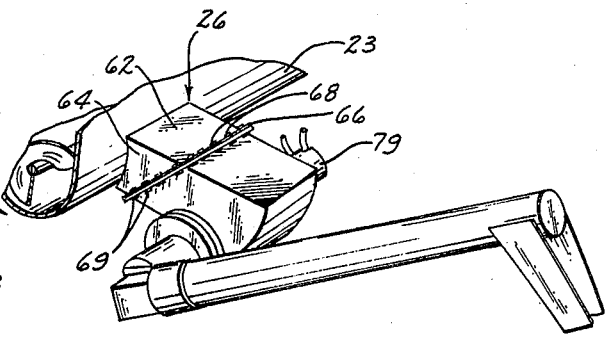
FIG. 6 is a perspective view of a modified augered unloader attachment connected to the apparatus.

A conventional augered unloader is illustrated in FIG. 6, modified to conform to the laterally disposed tank outlet 26. The power for the augered attachment is supplied by a hydraulic motor 79 connected as previously described.

Figure 7:
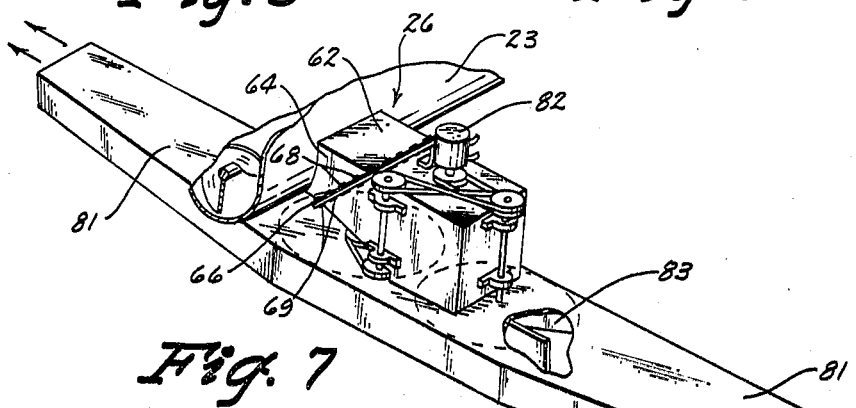
FIG. 7 is a perspective view of a modified solid fertilizer spreader attachment connected to the apparatus, with certain parts being broken away for clarity of illustration.

A conventional dry fertilizer spreader is illustrated in FIG. 7 modified to conform to the laterally disposed outlet 26 of the tank trough 23 as previously described. The lateral guiding shield 81 is disposed under the trough 23 and lateral to the longitudinal axis of the vehicle 10. A hydraulic motor 82 is used to power a pair of rotating beaters 83 (only one showing) for throwing the fertilizer out both ends of the shield 81.

Figure 8:
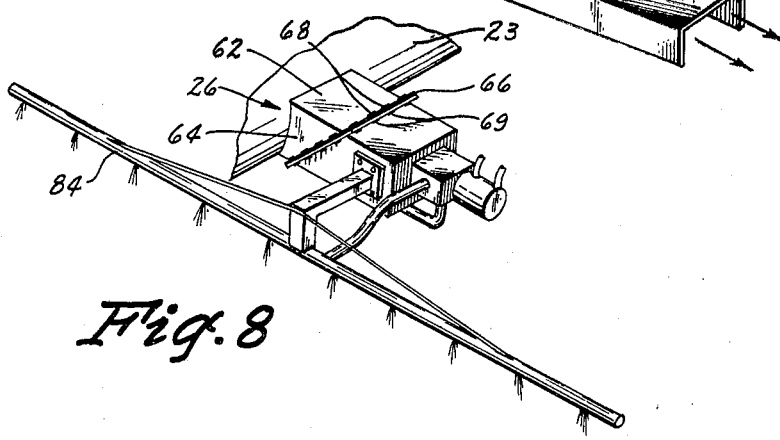
FIG. 8 is a perspective view of a modified liquid fertilizer spreader attachment connected to the apparatus.

A conventional liquid fertilizer spreader is illustrated in FIG. 8 modified to conform to the lateral outlet 26 of the present invention. The spreader tubes 84 traverse the longitudinal axis of the vehicle 10 under the trough 23.

The attachments illustrated in FIGS. 5-8 are shown for the purpose of illustrating the ready adaptability of the present invention to numerous uses and are not necessarily claimed as part of the present invention. Each attachment, however, is presently available on the market attached to a longitudinal end wall of the material carrying body and must be modified for lateral attachment.

In operation, the tank 11 of the vehicle 10 is loaded with the material of choice through the large top bay opening by pivoting the top panels 18, 19 outwardly. The first loaded material will settle to the trough 23 bottom of the tank 11 and the subsequent material will stack upon it to the desired amount or capacity of the tank 11. In the loading and transportation of the material, the slide door 28 is in a closed position so that when the auger 48 and agitator 38, 38' are rotating, the material moves along the trough 23 to the flightless portion 58 of the auger 48 where its is pushed upward to engage the revolving agitator 38, 38' at the point 44 for redistribution throughout the tank 11, thus merging the first loaded material with the latter and forming a homogenous mixture.

To discharge the material, the outlet slide door 28 is opened and the inwardly fed material from the trough 23 pushes through the outlet 26 passageway to the dumping area or to an appropriately attached spreader-discharge attachment (FIGS. 5–8) to be spread in the conventional manner. The bottom recessed auger 48 sweeps the tank 11 of all material residue.

The cylindrical shape of the mixing tank 11 provides the vehicle 10 of this invention with three necessary features; the first being that there is a constant slope of the sides 16 toward the bottom trough 23 and outlet 26; secondly, it provides greater storage at a lower level of the tank 11 than is common in flare-type boxes, and thus the vehicle 10 has a lower center of gravity, and thirdly it provides the enclosed tank 11 with a uniform space between the inner periphery and the longitudinal axis of the tank 11 to enable rotating mixers to substantially stir the entire area within the tank 11.

Although a preferred embodiment has been described hereinbefore, it is to be remembered that various modifications may be made without departing from the true spirit and scope of the invention as defined in the appanded claims.

I claim:
1. An apparatus for mixing bulk material comprising:
   an elongated tank having a cylindrical inner chamber and having at least one opening formed therein for passing bulk material therethrough;
   said tank having a cylindrical trough formed along the bottom thereof, the upper portion of said trough being open to said tank chamber;
   an auger rotatably mounted longitudinally within said trough, said auger having reversed flighting at opposite ends for moving material from opposite ends of said tank chamber toward the center thereof; and
   mixing means including a spiral agitator rotatably mounted longitudinally in said tank chamber, said agitator having reversed spiral numbers for moving material from the center of said tank chamber in opposite directions towards the ends thereof, the periphery of said spiral members disposed in close proximity with the periphery of said auger.

2. An apparatus for mixing bulk material as defined in claim 1, wherein the longitudinal axis of said trough extends parallel to the longitudinal axis of said tank chamber.

3. An apparatus for mixing bulk material as defined in claim 2, wherein the diameter of said spiral agitator is slightly less than the diameter of said tank chamber.

4. An apparatus for mixing bulk material as defined in claim 3, wherein the diameter of said auger is slightly less than the diameter of said trough.

5. An apparatus for mixing bulk materials as defined in claim 4, wherein said auger includes a flightless area disposed between said reverse flighting, and a discharge opening formed in said trough adjacent said flightless area.

6. An apparatus for mixing bulk material as defined in claim 5, wherein said flightless area is aligned with the junction of said reversed spiral members of said agitator.

References Cited

UNITED STATES PATENTS

| | | | |
|---|---|---|---|
| 208,169 | 9/1878 | Gue | 259—41 |
| 402,393 | 4/1889 | Broughton | 259—179 |
| 2,576,177 | 11/1951 | Herr | 259—6 |
| 3,170,675 | 2/1965 | Cairnie | 259—6 |
| 3,194,639 | 7/1965 | Brown et al. | 259—97 XR |
| 3,273,734 | 9/1966 | Schuler | 259—97 XR |
| 3,393,898 | 7/1968 | Lanier | 259—4 |

WALTER A. SCHEEL, Primary Examiner

JOHN M. BELL, Assistant Examiner

U.S. Cl. X.R.

259—41, 97, 179